United States Patent
Graessley (10) Patent No.: US 11,441,919 B2
(45) Date of Patent: Sep. 13, 2022

(54) INTELLIGENT RESTRICTION OF DEVICE OPERATIONS

(75) Inventor: Joshua V. Graessley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 661 days.

(21) Appl. No.: 11/862,054

(22) Filed: Sep. 26, 2007

(65) Prior Publication Data

US 2009/0082951 A1 Mar. 26, 2009

(51) Int. Cl.
*G01C 21/00* (2006.01)
*G01C 21/36* (2006.01)

(52) U.S. Cl.
CPC ..... *G01C 21/3641* (2013.01); *G01C 21/3602* (2013.01); *G01C 21/3617* (2013.01)

(58) Field of Classification Search
None
See application file for complete search history.

(56) References Cited

U.S. PATENT DOCUMENTS

| | | | |
|---|---|---|---|
| 4,731,769 A * | 3/1988 | Schaefer et al. | 369/6 |
| 4,754,255 A * | 6/1988 | Sanders | B60R 25/23 340/5.31 |
| 5,404,443 A * | 4/1995 | Hirata | 725/75 |
| 5,471,389 A * | 11/1995 | Hahlganss | 455/456.6 |
| 5,483,261 A | 1/1996 | Yasutake | |
| 5,488,204 A | 1/1996 | Mead et al. | |
| 5,552,806 A * | 9/1996 | Lenchik | 345/156 |
| 5,559,504 A * | 9/1996 | Itsumi | G01L 1/20 178/18.05 |
| 5,757,359 A * | 5/1998 | Morimoto et al. | 345/156 |
| 5,784,036 A * | 7/1998 | Higuchi et al. | 345/7 |
| 5,794,164 A * | 8/1998 | Beckert et al. | 455/3.06 |
| 5,815,407 A * | 9/1998 | Huffman et al. | 702/57 |
| 5,825,352 A | 10/1998 | Bisset et al. | |
| 5,835,079 A | 11/1998 | Shieh | |
| 5,880,411 A | 3/1999 | Gillespie et al. | |
| 5,949,345 A * | 9/1999 | Beckert et al. | 340/815.41 |
| 5,990,865 A * | 11/1999 | Gard | 345/156 |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Bhavesh V Amin
(74) *Attorney, Agent, or Firm* — Kubota & Basol LLP (57) ABSTRACT

A navigation system includes a user interface for detecting touch input. The system uses touch input to determine if a driver or passenger is operating the navigation system. If the system determines that the driver is operating the system, then an action is initiated (e.g., the user interface is locked down, a warning is provided). The navigation system allows a passenger in the vehicle to operate the navigation system while the vehicle is in motion. In an aspect, additional or other sensors (e.g., seat sensor, seat belt sensor, infrared sensor) can be used to detect whether a driver or passenger is operating the navigation system while the vehicle is in motion.

25 Claims, 3 Drawing Sheets

(56) References Cited

U.S. PATENT DOCUMENTS

| | | | | |
|---|---|---|---|---|
| 6,008,800 A * | 12/1999 | Pryor | | 345/173 |
| 6,029,110 A * | 2/2000 | Zuber et al. | | 701/400 |
| 6,040,824 A * | 3/2000 | Maekawa et al. | | 345/173 |
| 6,100,811 A * | 8/2000 | Hsu | | B60R 25/2081 340/426.36 |
| 6,157,372 A * | 12/2000 | Blackburn | | G06F 3/04883 345/157 |
| 6,188,315 B1 * | 2/2001 | Herbert | | B60R 16/0232 340/438 |
| 6,188,391 B1 | 2/2001 | Seely et al. | | |
| 6,256,558 B1 * | 7/2001 | Sugiura | | B60K 37/06 340/529 |
| 6,266,589 B1 * | 7/2001 | Boies | | B60Q 9/00 701/1 |
| 6,310,610 B1 | 10/2001 | Beaton et al. | | |
| 6,323,846 B1 * | 11/2001 | Westerman | | G06F 3/04815 345/173 |
| 6,415,224 B1 * | 7/2002 | Wako | | G01C 21/3611 340/903 |
| 6,502,022 B1 * | 12/2002 | Chastain | | G01C 21/26 701/36 |
| 6,570,557 B1 * | 5/2003 | Westerman | | G06F 3/04883 400/489 |
| 6,574,531 B2 * | 6/2003 | Tan | | B60K 35/00 345/204 |
| 6,580,372 B1 * | 6/2003 | Harris | | B67D 7/3236 141/192 |
| 6,580,984 B2 * | 6/2003 | Fecher et al. | | 701/36 |
| 6,603,462 B2 * | 8/2003 | Matusis | | G06F 3/0219 345/173 |
| 6,614,920 B2 * | 9/2003 | Floyd | | B60R 25/021 340/5.53 |
| 6,633,090 B2 * | 10/2003 | Harter | | B60R 25/252 307/10.6 |
| 6,650,345 B1 * | 11/2003 | Saito | | B60K 37/06 345/173 |
| 6,653,948 B1 * | 11/2003 | Kunimatsu | | G01C 21/367 340/995.16 |
| 6,677,932 B1 * | 1/2004 | Westerman | | G06F 3/04886 345/173 |
| 6,687,614 B2 * | 2/2004 | Ihara | | G01C 21/36 340/988 |
| 6,690,387 B2 | 2/2004 | Zimmerman et al. | | |
| 6,690,940 B1 * | 2/2004 | Brown | | H04M 1/6075 340/438 |
| 6,710,770 B2 * | 3/2004 | Tomasi | | G06F 1/1613 345/156 |
| 6,717,287 B2 * | 4/2004 | Tengler | | B60K 35/00 307/10.1 |
| 6,718,240 B1 * | 4/2004 | Suda | | B60N 2/0248 340/5.72 |
| 6,727,800 B1 * | 4/2004 | Dutu | | B60R 25/257 340/426.11 |
| 6,731,925 B2 * | 5/2004 | Naboulsi | | B60R 11/02 340/575 |
| 6,784,869 B1 * | 8/2004 | Clark | | G06F 3/0481 345/156 |
| 6,788,189 B2 * | 9/2004 | Kikkawa | | B60R 25/33 340/426.11 |
| 6,820,061 B2 * | 11/2004 | Postrel | | 705/14.27 |
| 6,828,899 B2 * | 12/2004 | Kim | | B60R 25/252 340/5.83 |
| 6,868,170 B1 * | 3/2005 | Fuku | | B60R 25/252 340/5.53 |
| 6,888,445 B2 * | 5/2005 | Gotfried | | B60R 25/04 235/382 |
| 6,888,536 B2 * | 5/2005 | Westerman | | G06F 3/0446 345/184 |
| 6,992,562 B2 * | 1/2006 | Fuks | | G07C 9/00563 340/5.71 |
| 7,006,793 B2 * | 2/2006 | Himmel | | H04B 1/3822 455/345 |
| 7,015,894 B2 | 3/2006 | Morohoshi | | |
| 7,023,427 B2 * | 4/2006 | Kraus | | G06F 3/0421 345/173 |
| 7,064,656 B2 * | 6/2006 | Belcher | | H04M 1/72577 340/425.5 |
| 7,084,859 B1 * | 8/2006 | Pryor | | G01C 21/3664 345/156 |
| 7,098,812 B2 * | 8/2006 | Hirota | | G01C 21/3602 340/438 |
| 7,119,709 B2 * | 10/2006 | Magner | | G07C 9/00182 340/426.36 |
| 7,126,583 B1 * | 10/2006 | Breed | | B60K 37/06 345/173 |
| 7,171,294 B2 * | 1/2007 | Kindo | | G08G 1/0969 348/148 |
| 7,184,064 B2 | 2/2007 | Zimmerman et al. | | |
| 7,228,213 B2 * | 6/2007 | Sakai | | B60K 28/00 701/49 |
| 7,239,040 B2 * | 7/2007 | Kitazawa | | B60K 35/00 297/217.3 |
| 7,239,947 B2 * | 7/2007 | Suzuki | | G01C 21/3664 701/36 |
| 7,389,182 B2 * | 6/2008 | Tomita | | G01C 21/34 340/995.19 |
| 7,463,961 B2 * | 12/2008 | Powers | | B60K 35/00 345/204 |
| 7,489,303 B1 * | 2/2009 | Pryor | | B60K 35/00 345/173 |
| 7,596,761 B2 * | 9/2009 | Lemay | | G06F 3/0483 715/764 |
| 7,640,101 B2 * | 12/2009 | Pair | | G01C 21/36 342/357.31 |
| 7,663,607 B2 | 2/2010 | Hotelling et al. | | |
| 7,702,458 B2 * | 4/2010 | Yokota | | G01C 21/3611 340/995.21 |
| 7,777,732 B2 * | 8/2010 | Herz | | G06F 3/0416 345/169 |
| 7,894,953 B2 * | 2/2011 | Geisler | | B60W 50/12 701/36 |
| 7,898,436 B2 * | 3/2011 | Galos | | G01C 21/3664 340/995.1 |
| 8,285,453 B2 * | 10/2012 | Schroeder | | G01C 21/3641 180/173 |
| 8,457,838 B1 * | 6/2013 | Fear | | B60K 35/00 701/1 |
| 8,461,970 B2 * | 6/2013 | Birkemeyer | | B60R 1/00 340/12.54 |
| 8,479,122 B2 | 7/2013 | Hotelling et al. | | |
| 9,272,689 B2 * | 3/2016 | Fung | | B60R 25/25 |
| 9,772,761 B2 * | 9/2017 | Ding | | H01M 10/486 |
| 10,410,075 B2 * | 9/2019 | Zebley | | G06F 21/32 |
| 2001/0026632 A1 * | 10/2001 | Tamai | | G06Q 20/4014 382/116 |
| 2002/0015024 A1 * | 2/2002 | Westerman | | G06F 3/0485 345/173 |
| 2003/0086588 A1 * | 5/2003 | Shinada | | B60R 25/255 382/104 |
| 2003/0093187 A1 * | 5/2003 | Walker | | B64D 45/0059 701/1 |
| 2003/0096594 A1 * | 5/2003 | Naboulsi | | B60R 11/02 455/411 |
| 2003/0137409 A1 * | 7/2003 | Kikkawa | | B60R 25/33 340/426.11 |
| 2003/0171939 A1 * | 9/2003 | Yagesh | | G06Q 10/06 705/325 |
| 2004/0036764 A1 * | 2/2004 | Hirota | | G01C 21/3602 348/77 |
| 2004/0056758 A1 * | 3/2004 | Schwartz | | B60K 28/04 340/5.2 |
| 2004/0100378 A1 * | 5/2004 | Hollnagel | | B60R 25/102 340/539.17 |
| 2004/0148062 A1 * | 7/2004 | Franke | | G01C 21/26 701/1 |
| 2004/0185842 A1 * | 9/2004 | Spaur | | H04W 12/069 455/410 |

(56) References Cited

U.S. PATENT DOCUMENTS

| | | | | |
|---|---|---|---|---|
| 2004/0225419 | A1* | 11/2004 | Sakai | B60R 25/102 701/1 |
| 2005/0046584 | A1* | 3/2005 | Breed | G06F 3/0219 340/13.31 |
| 2005/0071119 | A1* | 3/2005 | Obradovich | G01C 21/3461 702/150 |
| 2005/0131607 | A1* | 6/2005 | Breed | B60N 2/002 701/45 |
| 2005/0137753 | A1* | 6/2005 | Basson | G01C 21/26 701/1 |
| 2005/0140660 | A1* | 6/2005 | Valikangas | G06F 3/04886 345/173 |
| 2005/0234637 | A1* | 10/2005 | Obradovich | G01C 21/3461 701/425 |
| 2005/0276448 | A1* | 12/2005 | Pryor | B60K 35/00 382/103 |
| 2006/0026521 | A1 | 2/2006 | Hotelling et al. | |
| 2006/0110016 | A1* | 5/2006 | Smith | G06V 10/993 382/115 |
| 2006/0197753 | A1 | 9/2006 | Hotelling | |
| 2006/0273880 | A1* | 12/2006 | Yuhara | B60R 25/305 340/5.83 |
| 2007/0002032 | A1* | 1/2007 | Powers | B60K 35/00 345/204 |
| 2007/0032912 | A1* | 2/2007 | Jung | B60K 37/00 701/1 |
| 2007/0032929 | A1* | 2/2007 | Yoshioka | G07C 5/008 701/33.4 |
| 2007/0257891 | A1* | 11/2007 | Esenther et al. | 345/173 |
| 2007/0260886 | A1* | 11/2007 | Dufour | G06V 40/10 713/186 |
| 2007/0262953 | A1* | 11/2007 | Zackschewski | B60K 35/00 345/156 |
| 2007/0273670 | A1* | 11/2007 | Nordahl | G06F 3/0416 345/173 |
| 2007/0297064 | A1* | 12/2007 | Watanabe | B60K 35/00 359/630 |
| 2008/0064446 | A1* | 3/2008 | Camp | H04M 1/66 455/565 |
| 2008/0086240 | A1* | 4/2008 | Breed | G07C 5/008 701/1 |
| 2008/0186282 | A1* | 8/2008 | Nix | B60K 37/00 345/173 |
| 2008/0192024 | A1* | 8/2008 | Mita | G06F 3/044 345/173 |
| 2010/0127847 | A1* | 5/2010 | Evans | G06F 3/04886 345/173 |
| 2010/0157061 | A1* | 6/2010 | Katsman | G07C 5/0866 348/149 |
| 2011/0304465 | A1* | 12/2011 | Boult | B60K 28/06 340/576 |
| 2013/0145297 | A1* | 6/2013 | Ricci | G06Q 40/08 715/765 |
| 2019/0188508 | A1* | 6/2019 | Zebley | G06F 21/6245 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

INTELLIGENT RESTRICTION OF DEVICE OPERATIONS

TECHNICAL FIELD

The subject matter of this patent application is generally related to user interfaces.

BACKGROUND

Navigations systems are rapidly becoming standard features in many automobiles and other vehicles. These navigations systems often rely on satellites or other technology to determine position coordinates of the vehicle. The position coordinates can be used with a map database to generate various map services, such as driving directions, landmarks, etc.

The use of a navigation system in a moving vehicle raises safety concerns, particularly if the driver of the vehicle is attempting to operate the navigation system while operating the vehicle. Many navigation systems use knobs and pushbuttons for entering destination and other information for use in determining driving directions. The accurate use of such input devices may force the driver to take her eyes off the road, resulting in a potentially hazardous condition.

Conventional solutions to this safety problem detect when the navigation system is being operated while the vehicle is moving and display a warning message notifying the user that operating the navigation system while the vehicle is moving is dangerous. Some conventional solutions may request that the user acknowledge the warning by pressing a pushbutton, for example. Once acknowledged, the navigation system typically becomes operable to the driver.

While conventional solutions are useful for providing warnings, many drivers simply ignore the warnings or acknowledge the warnings and continue operating the navigation system while driving the vehicle. Some users may even discover a way to defeat the solution.

Also, there are few safety concerns with a passenger in the vehicle operating the navigation system while the vehicle is moving. For passengers, the warnings may be unnecessary or irritating, and locking down the operation of the navigation system would prevent the passenger from operating the navigation system regardless of whether it was safe to do so.

SUMMARY

A navigation system includes a user interface for detecting touch input. The system uses touch input to determine if a driver or passenger is operating the navigation system. If the system determines that the driver is operating the system, then an action is initiated (e.g., the user interface is locked down, a warning is provided). The navigation system allows a passenger in the vehicle to operate the navigation system while the vehicle is in motion. In an aspect, additional or other sensors (e.g., seat sensor, seat belt sensor, infrared sensor, biometric sensor) can be used to detect whether a driver or passenger is operating the navigation system while the vehicle is in motion.

Other implementations are disclosed, including implementations directed to methods, systems and computer-readable mediums.

DETAILED DESCRIPTION

System Overview

Figure 1:
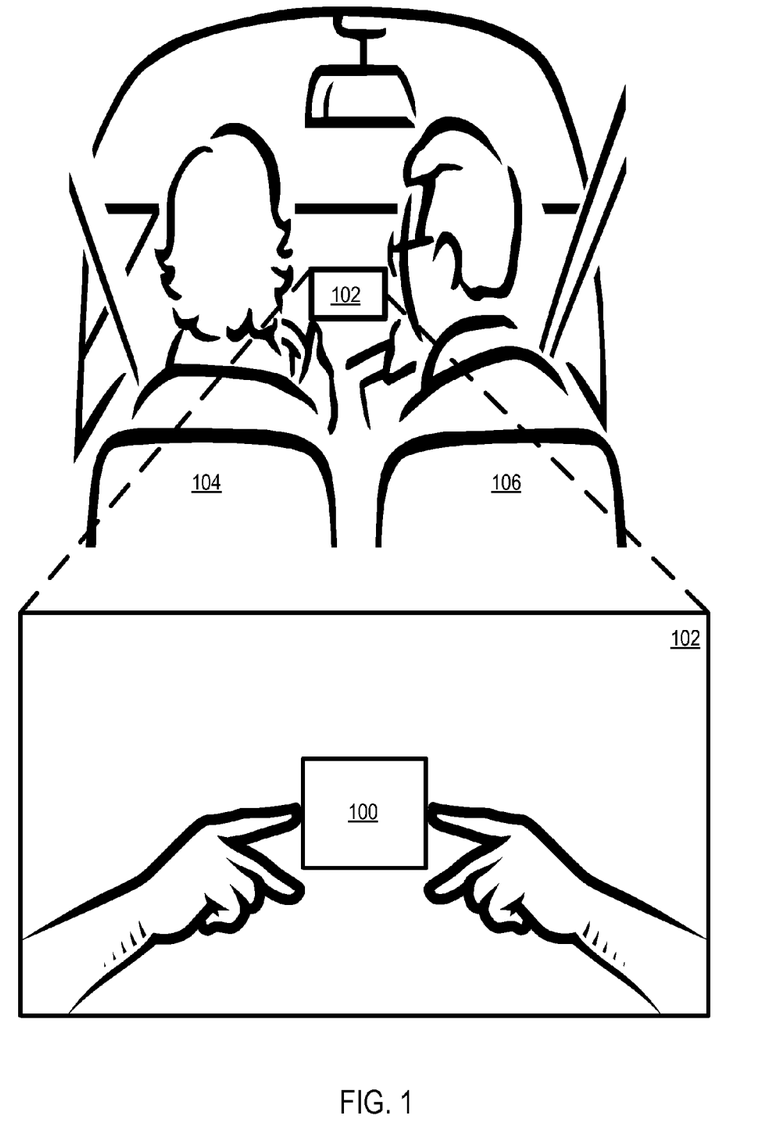
FIG. 1 illustrates an interface for a vehicle navigation system.

FIG. 1 illustrates an interface 100 (e.g., a touch-sensitive display) for a vehicle navigation system 102. The navigation system 102 can, for example, be implemented as a hardwired device, a removable device, a wireless device, a handheld computer, a personal digital assistant, a cellular telephone, or some combination of these data processing devices or other data processing devices. The system 102 can generally include satellite navigation functionality designed to acquire position data to locate a user on a road using previously stored or newly acquired map databases. In particular, the navigation system 102 includes circuitry and sensors for supporting a location determining capability, such as that provided by the global positioning system (GPS). In some implementations, the navigation system 102 can implement multiple device functionalities in addition to navigation, such as phone, email, and media processing functionalities, for example.

As shown, the vehicle navigation system 102 includes a touch-sensitive display 100. The touch-sensitive display 100 can implement a liquid crystal display (LCD) device, a light emitting polymer display (LPD) technology, or some other display technology. The touch-sensitive display 100 can be sensitive to haptic and/or tactile contact with a user.

In some implementations, contact between the touch-sensitive display 100 and the user corresponds to one or more digits of the user. The touch-sensitive display 100 can, for example, comprise a multi-touch-sensitive display 100. The multi-touch-sensitive display 100 can, for example, process multiple simultaneous touch points, including processing data related to the pressure, degree and/or position of each touch point. Such processing can be utilized to facilitate identifying specific gestures and interactions with multiple fingers, chording, and other interactions. Other touch-sensitive display technologies can also be used, for example, a display in which a point of contact corresponds to a stylus device.

In some implementations, the navigation system 102 can include a graphical user interface displayed on the touch-sensitive display 100 that provides the user access to various system objects and conveys information to the user to facilitate an intuitive user experience. In some implementations of the graphical user interface, the touch-sensitive display 100 can, for example, include one or more display objects. Each of the display objects can be a graphic representation of a system object. Example system objects include device functions, applications, windows, files, alerts, map links, events, or other identifiable system objects.

As shown in FIG. 1, the navigation system 102 is provided in a dashboard between a driver 104 and a passenger 106. In some implementations, the driver position 104 and the passenger position 106 can be switched (e.g., non-US vehicles and driving conditions). The driver 104 and passenger 106 can provide a multi-touch input into the multi-touch-sensitive display 100.

The navigation system 102 can include one or more input/output devices and/or sensor devices. For example, a speaker and a microphone can be included to facilitate voice-enabled functionalities, such as navigation, stereo, and phone functions. In some implementations, a loud speaker can be included to facilitate hands-free voice command functionalities, such as voice activated entry for requesting driving directions.

In some implementations, a seat sensor can be included to engage safety features for enabling or disabling the navigation device while the vehicle is in motion. For example, while the vehicle is in motion, the seat sensor can be used to facilitate the detection of a particular payload in a one or more of the vehicle seats. In response to the detection, the navigation device 102 can engage the touch-sensitive display 100 to lock, unlock, become operable, or become inoperable, to one or more users based on the sensor trigger. As an example, the system 102 can be preconfigured to allow use of the navigation system functionality by a passenger, but not a driver. In some implementations, the configuration can be based on the seat sensor having a particular weight. For example, if weight is not detected in the passenger seat, the navigation system may be configured to disallow use of functionality related to entering new destinations or any operation that may take the driver's attention away from the road for too long while the vehicle is in motion.

In some implementations, a seat belt sensor can be included in navigation system 102 to determine whether a passenger is present in the vehicle. For example, if the passenger side seat belt is fastened, the navigation system 102 may allow use to the passenger entry of input. The allowed usage may be further scrutinized based on detection of the angle of the input provided on the touch-sensitive display 100 (e.g., angle of the user's finger at the touch point relative to a predefined reference frame). The angle detection can provide the navigation device 102 with the functionality to determine whether a driver or passenger is operating the navigation system. As such, the combination of any or all of a seat sensor, seat belt sensor, angle detection, or other sensors can determine which user provided input to system 102.

In some implementations, an infrared sensor can be included in navigation system 102 to detect body heat from a passenger position or driver position. The infrared sensor can measure infrared light radiating from one or more objects in a field of view. In one example, a passive infrared (PIR) based motion detector can be used to detect apparent motion. In particular, apparent motion is detected when an infrared source with one temperature, such as a human, passes in front of an infrared source with another temperature, such as a vehicle seat. The difference in the temperature can be used to determine whether a passenger is in the vehicle and operable to input data into device 102, for example. In another example, the infrared sensor can be used to determine which portion of the touch-sensitive display is infiltrated by a digit or hand. Thus, the navigation system 102 can detect whether the driver or passenger provided input.

In some implementations, a proximity sensor can be included in navigation system 102 to facilitate the detection of the user providing input during use and, in response, to disengage the touch-sensitive display 100 to prevent accidental function invocations while the device displays driving directions, for example. In some implementations, the touch-sensitive display 100 can be turned off to conserve additional power when the navigation device 102 is not in use.

In some implementations, a biometric sensor can be included in navigation system 102 to determine intrinsic physical traits of a user. For example, the biometric sensor may be a fingerprint sensor, voice recognition sensor, iris recognition, or other sensor used to recognize a user identity. The recognizing factors can be stored in navigation device 102 where the factors can be used to configure usability information for users of system 102. For example, a fingerprint can be stored for a vehicle owner which can be configured to enable use of navigation system 102 at all times without limitation. At some point, the vehicle owner may store biometric information about other drivers in the family and place restrictions on the users. The restrictions can include operating navigation system 102 functions related to entering new destinations, for example, when the restricted user is a passenger, but not a driver. As such, the restricted user may input data into the navigation system 102 in the passenger seat, but may not input extensive data into the system 102 when in the driver's seat. Thus, the restrictions may protect the safety of the driver and the passenger by restricting any operation that may avert the driver's attention away from the road.

In some implementations, the navigation device 102 may include one or more optional optical sensors, such as complementary metal-oxide semiconductor (CMOS) or charged coupled device (CCD) image sensors, for use in imaging applications. Other sensors can also be used.

In some implementations, a digital camera can be included on navigation device 102 to capture snapshots of maps, points of interest, directions, and the like. In one example, if the navigation device 102 is removable, the digital camera can perform standard camera functions, such as recording photographs and video clips.

Other operations on system 102 can also be allowed or disallowed based on sensing technology. For example, navigation system 102 can lock out functions such as text messaging, mobile device, browsing, and such, based on biometrics, vehicle movement, proximity, and the like.

The navigation system 102 can also include one or more wireless communication subsystems, such as an 802.11b/g communication device 186, and/or a Bluetooth™ communication device. Other communication protocols can also be supported, including other 802.x communication protocols, code division multiple access (CDMA), global system for mobile communications (GSM), Enhanced Data GSM Environment (EDGE), etc.

In operation, the navigation system 102 can detect touch input based on an angle of a user's finger or fingers, a biometric or other sensing capability. The touch input detection can be used to determine whether a driver or passenger can gain access to navigation system 102. In particular, the input detection can be configured to allow or disallow some or all functionality with the navigation system 102. For example, based on the angle of touch input, a user may be granted partial use of system 102, such as canceling a route or receiving directions to home. Other functions, such as using the mobile phone, text messaging, and other navigation functionality may be locked out until the user is no longer driving and/or moving the vehicle.

Figure 2:
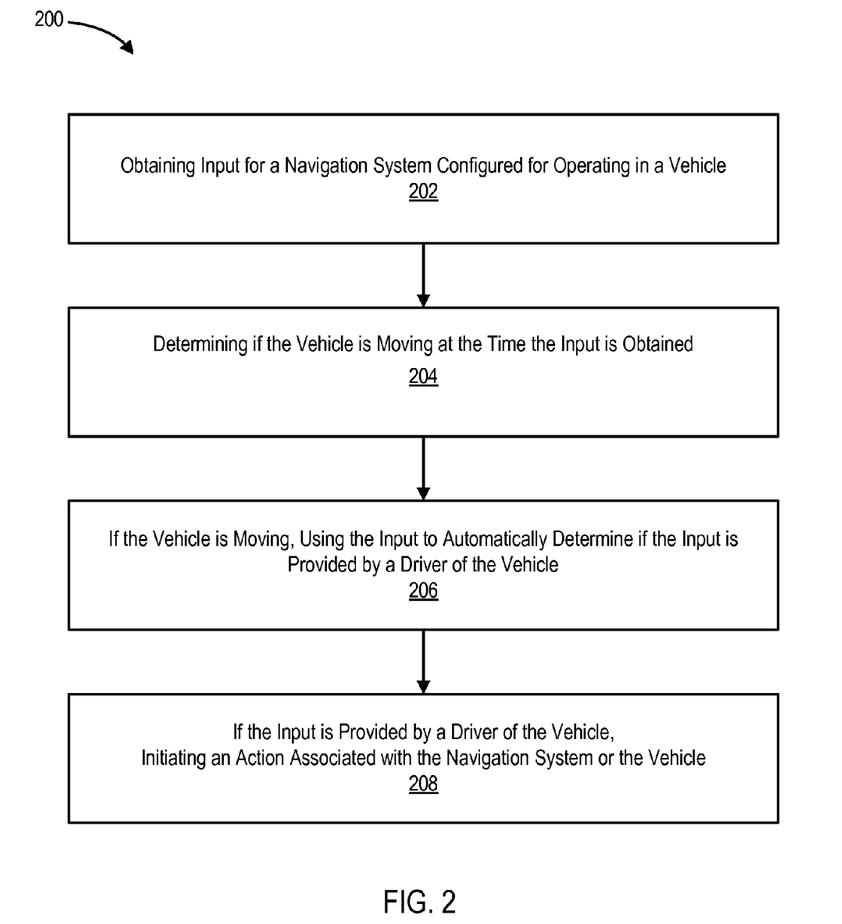
FIG. 2 is a flow diagram of an example process for detecting driver/passenger operation of the navigation system of FIG. 1.

FIG. 2 is a flow diagram of an example process 200 for detecting driver or passenger operation of the navigation system of FIG. 1. While the detection process 200 described below includes a number of operations that appear to occur in a specific order, it should be apparent that the process 200 can include more or fewer operations, which can be executed serially or in parallel (e.g., using parallel processors or a multi-threading environment).

The detection process 200 includes obtaining input for a navigation system configured for operating in a vehicle (202). In one example, the input can be obtained by means of touch input through a touch-sensitive display. For example, the input can include a finger gesture on the touch-sensitive display 100 (e.g., a touch input from the driver 104 or passenger 106). Other inputs can include sensor input (e.g., input from a seat sensor, a seatbelt sensor, an infrared sensor, a proximity sensor, an optical sensor, etc.), biometric input (e.g., input from a fingerprint sensor, hand geometry sensor, a voice recognition sensor, etc.), user motion input (e.g., a motion detector sensor), digital camera input (e.g., analyzed digital photo), retrieved data (e.g., previously stored data), remotely received data (e.g., data received from a remote device over a communication channel), or other input decipherable by navigation system 102, for example. In some implementations, input data may be retrieved from user files stored in memory within the navigation system 102. Any number of user files can be stored in navigation system 102. The user files can include data about particular drivers or users of system 102. For example, the user file data can include driving records (e.g., age, driving rules, usage rights on the navigation system, etc.), biometric data (e.g., fingerprints, voice, etc.), mobile phone identifier data (e.g., Bluetooth™ identification of a mobile device), or other recognition data used to determine which user is providing the input to system 102.

In some implementations, input can be received in navigation system 102 from a remote device over a communication channel. For example, the driver 104 may possess a mobile phone on her person which can be detected by the navigation system 102 when the driver 104 is proximate to the system. The detection may use Bluetooth™ communication from the navigation system 102 to the driver's mobile phone. In another example, the detection can occur from the navigation system 102 to the driver's Bluetooth™ ear piece in the event that the navigation system 102 also hosts the user's mobile phone functionality (e.g., vehicle phone, iPhone™, etc.).

The navigation system 102 determines if the vehicle is moving at the time the input is obtained (204). For example, the navigation system 102 can detect whether a vehicle is in gear or in park to determine if the vehicle is in motion. As another example, the navigation system 102 can be communicatively coupled (wired or wirelessly) to particular sensors in the vehicle, such as tire sensors, engine sensors, steering sensors, or other feedback sensor to determine whether the vehicle is in motion. In general, the coupled communication can enable the navigation system to gain knowledge regarding the state of the vehicle. In some implementations, the navigation system can perform a diagnostic test using the GPS technology, for example, to determine if and/or how fast the vehicle is moving from one point in time to another.

If the navigation system 102 detects the vehicle is not in motion, the navigation device 102 can be operated by any or all users, if the users are authorized to operate the navigation device 102. For example, one or more users may be locked from using the navigation system whether the vehicle is in motion or not. In particular, a code may be requested by the system 102 to deter unauthorized use of the GPS navigation or other features in system 102, for example.

In the event the navigation system 102 determines the vehicle is currently in motion, the navigation system 102 uses the input to automatically determine if the input is provided by a driver of the vehicle (206). The automatic determination can include detecting one or more fingers or one or more angles of the fingers based on the multi-touch input. For example, the multi-touch screen 100 can determine a position and pressure or degree of each touch point. The angle detection can provide the navigation device 102 with the functionality to determine whether a driver or passenger is operating the navigation system. For example, the navigation device 102 can determine if the driver 104 is operating the navigation system based on the results of the detection (e.g., the particular angle used to engage the multi touch screen 100). For vehicles with the driver seated on the right side (e.g., automobiles operating in the United Kingdom), the navigation system 102 can be configured to account for the seating arrangement. Alternatively, the navigation system 102 can provide an interface for the user to enter in a particular seating arrangement.

Techniques for detecting finger angles from multi-touch input are described in, for example, U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety.

In some implementations, it may be difficult to determine the angle of a touch point, such as when multiple gestures and interactions with multiple fingers or hands (similar to chording) provide input on device 102. As such, the navigation system 102 can be configured to detect a fingerprint, voice or other biometric sensor feedback to determine the user providing the input.

In the event that the input is provided by a driver of the vehicle, the navigation system 102 initiates an action associated with the navigation system or the vehicle (208). For example, system 102 can lock down the touch-sensitive display 100 upon determining the driver provided input to the system 102. The lock down may be implemented for the safety of the driver and passengers. For example, if the driver is entering input into device 102, the driver may not be able to concentrate on driving. Thus, the system 102 can automatically lock out some or all navigation entry functionality upon determining the input was provided by the driver of the vehicle. Alternatively, if the input is provided by a passenger (e.g., determined by the particular angle used to engage the multi touch screen 100), the system may not lock out navigation entry functions. Advantageously, passengers in the vehicle can operate the device 102 while the vehicle is in motion. In some implementations, an override can be preconfigured for one or more drivers. For example, a more experienced driver may configure the system 102 to allow one or more drivers to interact with the navigation system 102 while the vehicle is in motion. Similarly, the configuration can preclude inexperienced drivers from providing input to the navigation system while the vehicle is in motion. The configuration can include identification of the driver using biometric sensors (e.g., fingerprint, digital camera recognition, hand geometry, voice recognition, etc.), mobile phone identifier (e.g., Bluetooth™, service provider, etc.). In some implementations, the navigation system 102 can use biometric input to determine whether a driver can legally operate the navigation system 102 and/or vehicle. For example, upon receiving a fingerprint input, the system 102 can search the department of motor vehicles for validation on the user's driving record or license and adjust the available navigation system functionality accordingly.

In some implementations, upon determining the input is provided by the driver, the system 102 can present a warning message to the user. The warning message can be presented on the touch-sensitive display 100. For example, a message can be presented indicating the system 102 can not be operated by the driver while the vehicle is in motion, but can be operated upon stopping the vehicle, placing the vehicle in park, or placing the vehicle in some other non-functioning state. In yet another example, the system 102 can lock down the touch-sensitive display 100 and present one or more warning messages to the user.

Portable Electronic Device Architecture

Figure 3:
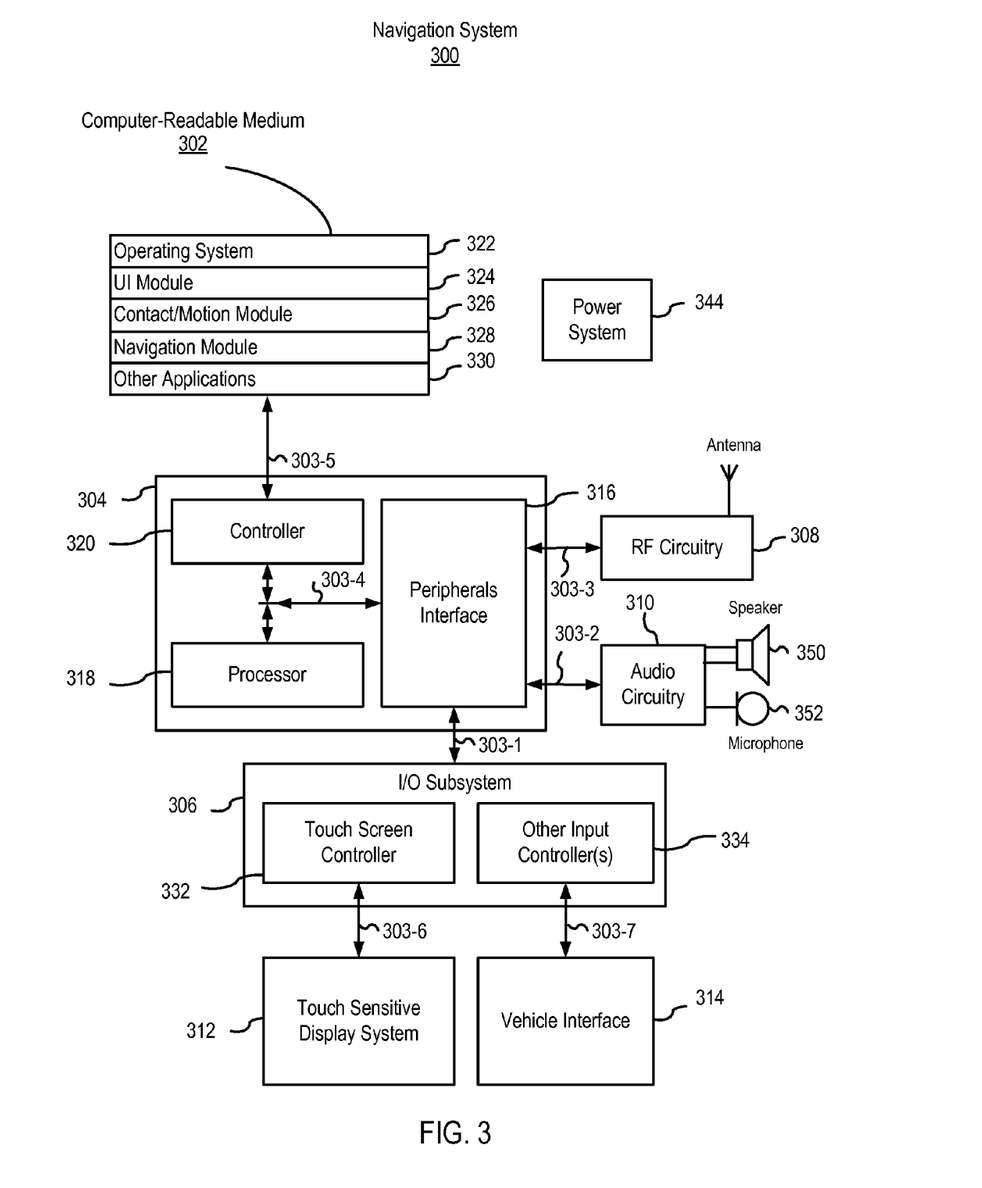
FIG. 3 is a block diagram of an example system architecture for the navigation system of FIG. 1.

FIG. 3 is a block diagram of an example system architecture for the navigation system 300 of FIG. 1. A navigation system 300 generally includes one or more computer-readable mediums 302, a processing system 304, an Input/Output (I/O) subsystem 306, radio frequency (RF) circuitry 308, and audio circuitry 310. These components may be coupled by one or more communication buses or signal lines 303. The device 300 can be any vehicle or personal navigation device, including but not limited to a hardwired device, a handheld computer, a tablet computer, a mobile phone, a media player, personal digital assistant (PDA) and the like, including a combination of two or more of these items.

It should be apparent that the architecture shown in FIG. 3 is only one example of an architecture for the navigation system 300, and that the device 300 could have more or fewer components than shown, or a different configuration of components. The various components shown in FIG. 3 can be implemented in hardware, software, or a combination of both hardware and software, including one or more signal processing and/or application specific integrated circuits. The RF circuitry 308 is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 308 is capable of establishing and maintaining communications with other devices using one or more communications protocols, including but not limited to time division multiple access (TDMA), code division multiple access (CDMA), global system for mobile communications (GSM), Enhanced Data GSM Environment (EDGE), wideband code division multiple access (W-CDMA), Wi-Fi (such as IEEE 802.11a, IEEE 802.11b, IEEE 802.11g and/or IEEE 802.11n), Bluetooth, Wi-MAX, voice over Internet Protocol (VoIP), a protocol for email, instant messaging, and/or a short message service (SMS), or any other suitable communication protocol, including communication protocols not yet developed as of the filing date of this document.

The RF circuitry 308 and the audio circuitry 310 are coupled to the processing system 304 via the peripherals interface 316. The interface 316 includes various known components for establishing and maintaining communication between peripherals and the processing system 304. The audio circuitry 310 is coupled to an audio speaker 350 and a microphone 352 and includes known circuitry for processing voice signals received from interface 316 to enable a user to communicate in real-time with other users. In some embodiments, the audio circuitry 310 includes a headphone jack (not shown). Voice and data information received by the RF circuitry 308 and the audio circuitry 310 (e.g., in speech recognition or voice command applications) is sent to one or more processors 318 via the peripherals interface 316. The one or more processors 318 are configurable to process various data formats for one or more applications programs 330 stored on the medium 302.

Note that the term "data" includes but is not limited to text, graphics, Web pages, JAVA applets, widgets, emails, instant messages, voice, digital images or video, widgets, MP3s, etc., which can be used by one or more applications programs 330 stored on the medium 302 (e.g., Web browser, email, etc.).

The peripherals interface 316 couples the input and output peripherals of the device to the processor 318 and the computer-readable medium 302. The one or more processors 318 communicate with the one or more computer-readable mediums 302 via a controller 320. The computer-readable medium 302 can be any device or medium that can store code and/or data for use by the one or more processors 318. The medium 302 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 302 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

The one or more processors 318 run various software components stored in the medium 302 to perform various functions for the device 300. In some embodiments, the software components include an operating system 322, a user interface module (or set of instructions) 324, a contact/motion module (or set of instructions) 326, a navigation module (or set of instructions) 328, and one or more applications (or set of instructions) 330.

The operating system 322 (e.g., Darwin, RTXC, LINUX, UNIX, OS X, WINDOWS, or an embedded operating system such as VxWorks) includes various procedures, sets of instructions, software components and/or drivers for controlling and managing general system tasks (e.g., memory management, storage device control, power management, etc.) and facilitates communication between various hardware and software components.

The user interface module 324 facilitates and manages user-received input. In some implementations, the user interface module 324 may be designed to receive a user input and translate the input into a particular response. The response can be presented in display (e.g., display 100) as a sidebar layout, a web page layout, or any other layout that allows for the presentation of user-customizable content.

The navigation module 328 includes various software components for determining a location. In some implementations, the navigation module 328 can access services over a network. For example, the navigation module 328 can access a navigation service to retrieve map information, location information, route information, points of interest, and other information.

In some implementations, the navigation module 328 includes one or more map databases for accessing a particular location. The map database is generally a vector map of some area of interest. As such, the navigation module 328 can access the map database to obtain street names or numbers and house numbers based on geographic coordinates of the desired street address. In some implementations, the navigation module 328 can also access points of interest based on geographic coordinates. Points of interest can include speed cameras, fuel stations, public parking, and information about a previous visit to a location The one or more applications 330 can include any applications installed on the device 300, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

The contact/motion module 326 includes various software components for performing various tasks associated with the touch-sensitive display system 312, as previously described with respect to the embodiments in FIGS. 1-3.

The I/O subsystem 306 is coupled to the touch-sensitive display system 312 and a vehicle interface 314 for controlling or performing various functions, such as power control, speaker volume control, ring tone loudness, keyboard input, scrolling, hold, menu, screen lock, clearing and ending communications and the like. The touch-sensitive display 312 communicates with the processing system 304 via the touch-sensitive screen controller 332, which includes various components for processing user input (e.g., scanning hardware). The one or more other input controllers 334 receives/sends electrical signals from/to the vehicle interface 314. The vehicle interface 314 may include physical buttons (e.g., push buttons, rocker buttons, etc.), dials, slider switches, sticks, and so forth.

The touch-sensitive display 312 displays visual output to the user in a GUI. The visual output may include text, graphics, video, and any combination thereof. Some or all of the visual output may correspond to user-interface objects. The touch-sensitive display 312 may also accept input from the user based on haptic and/or tactile contact. The touch-sensitive display 312 forms a touch-sensitive surface that accepts user input. The touch-sensitive display 312 and the touch screen controller 332 (along with any associated modules and/or sets of instructions in the medium 302) detects contact (and any movement or release of the contact) on the touch-sensitive display 312 and converts the detected contact into interaction with user-interface objects, such as one or more soft keys, that are displayed on the touch screen when the contact occurs. In an exemplary embodiment, a point of contact between the touch-sensitive display 312 and the user corresponds to one or more digits of the user. The touch-sensitive display 312 may use LCD (liquid crystal display) technology, or LPD (light emitting polymer display) technology, although other display technologies may be used in other embodiments. The touch-sensitive display 312 and touch screen controller 332 may detect contact and any movement or release thereof using any of a plurality of touch sensitivity technologies, including but not limited to capacitive, resistive, infrared, and surface acoustic wave technologies, as well as other proximity sensor arrays or other elements for determining one or more points of contact with the touch-sensitive display 312.

The touch-sensitive display may be analogous to the multi-touch-sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, the touch screen 126 displays visual output from the portable device, whereas touch-sensitive tablets do not provide visual output. The touch-sensitive display 312 may have a resolution in excess of 100 dpi. In an exemplary embodiment, the touch-sensitive display 312 may have a resolution of approximately 168 dpi. The user may make contact with the touch-sensitive display 312 using any suitable object or appendage, such as a stylus, pen, finger, and so forth.

In some embodiments, in addition to the touch screen, the device 300 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch-sensitive display 312 or an extension of the touch-sensitive surface formed by the touch-sensitive display 312.

The device 300 also includes a power system 344 for powering the various hardware components. The power system 344 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In some embodiments, the peripherals interface 316, the one or more processors 318, and the memory controller 320 may be implemented on a single chip, such as the processing system 304. In some other embodiments, they may be implemented on separate chips.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   obtaining touch input via a touch-sensitive display of a system configured for operating in a vehicle, wherein the touch input corresponds to one or more contacts detected on the touch- sensitive display and comprises touch data from one or more touch sensors of the touch-sensitive display;
   determining if the vehicle is moving at a time the touch input is obtained;
   if the vehicle is moving at the time the touch input is obtained, automatically determining which of a driver and a passenger of the vehicle provided the touch input, wherein the automatically determining comprises:
      determining, based on the touch data from the one or more touch sensors of the touch-sensitive display, one or more angles, relative to a predefined reference frame, of one or more geometric parameters identified in the touch input corresponding to the one or more contacts; and
      determining if the driver is operating the system based on at least results of the determination of the one or more angles; and
   adjusting access to functionality of the system based on which of the driver and the passenger provided the touch input, including:
      in accordance with a determination that the driver provided the touch input:
         in accordance with a determination that the driver that provided the touch input is a first user that has an identity registered with the system, enabling access to at least one function of the system based on the identity of the first user that is registered with the system; and
         in accordance with a determination that the driver that provided the touch input is a second user that has an identity registered with the system, different from the first user, limiting access to the at least one function of the system based on the identity of the second user that is registered with the system.

2. The method of claim 1, wherein the touch input is multi-touch input and the touch-sensitive display is a multi-touch-sensitive display.

3. The method of claim 1, further comprising:
   locking down the touch-sensitive display or presenting a warning message when the driver provided the touch input.

4. The method of claim 3, wherein the warning message is presented on the touch-sensitive display.

5. The method of claim 1, wherein determining if the vehicle is moving at the time the touch input is obtained, further comprises:
   obtaining information indicating movement of the vehicle from the system or the vehicle.

6. The method of claim 1, wherein automatically determining is further based on input provided by one or more sensors from a group of sensors consisting of: a seat sensor, a seatbelt sensor, an infrared sensor, a proximity sensor, an optical sensor, a biometric sensor and a digital camera.

7. The method of claim 1, wherein automatically determining is further based on information previously stored in the system.

8. The method of claim 1, wherein automatically determining is further based on information received from a remote device over a communication channel.

9. An apparatus, comprising:
   an interface including a touch-sensitive display, the interface configurable for obtaining touch input for a system configured for operating in a vehicle, wherein the touch input corresponds to one or more contacts detected on the touch-sensitive display and comprises touch data from one or more touch sensors of the touch-sensitive display; and
   a processor coupled to the interface and configurable for:
      determining if the vehicle is moving at a time the touch input is obtained,
      if the vehicle is moving at the time the touch input is obtained, automatically determining which of a driver and a passenger of the vehicle provided the touch input, wherein the automatically determining comprises:
         determining, based on the touch data from the one or more touch sensors of the touch-sensitive display, one or more angles, relative to a predefined reference frame, of one or more geometric parameters identified in the touch input corresponding to the one or more contacts, and
         determining if the driver is operating the system based on at least results of the determination of the one or more angles, and
      adjusting access to functionality of the system based on which of the driver and the passenger provided the touch input, including:
         in accordance with a determination that the driver provided the touch input:

in accordance with a determination that the driver that provided the touch input is a first user that has an identity registered with the system, enabling access to at least one function of the system based on the identity of the first user that is registered with the system; and in accordance with a determination that the driver that provided the touch input is a second user that has an identity registered with the system, different from the first user, limiting access to the at least one function of the system based on the identity of the second user that is registered with the system.

10. The apparatus of claim 9, wherein the touch-sensitive display is a multi-touch-sensitive display.

11. The apparatus of claim 9, wherein the processor is configured to lock down the touch-sensitive display or present a warning message when the touch input is provided by the driver.

12. The apparatus of claim 11, wherein the warning message is presented on the touch-sensitive display.

13. The apparatus of claim 9, wherein the processor determines if the vehicle is moving at the time the touch input is obtained by obtaining information indicating movement of the vehicle from the system or the vehicle.

14. The apparatus of claim 9, wherein automatically determining is further based on input provided by one or more sensors from a group of sensors consisting of: a seat sensor, a seatbelt sensor, an infrared sensor, a proximity sensor, an optical sensor, a biometric sensor and a digital camera.

15. The apparatus of claim 9, wherein automatically determining is further based on information previously stored in the system.

16. The apparatus of claim 9, wherein automatically determining is further based on information received from a remote device over a communication channel.

17. A non-transitory computer readable storage medium storing instructions, which when executed by a processor, cause the processor to perform a method comprising:

obtaining touch input via a touch-sensitive display of a system configured for operating in a vehicle, wherein the touch input corresponds to one or more contacts detected on the touch-sensitive display and comprises touch data from one or more touch sensors of the touch-sensitive display;

determining if the vehicle is moving at a time the touch input is obtained;

if the vehicle is moving at the time the touch input is obtained, automatically determining which of a driver and a passenger of the vehicle provided the touch input, wherein the automatically determining comprises:

determining, based on the touch data from the one or more touch sensors of the touch-sensitive display, one or more angles, relative to a predefined reference frame, of one or more geometric parameters identified in the touch input corresponding to the one or more contacts; and determining if the driver is operating the system based on at least results of the determination of the one or more angles; and adjusting access to functionality of the system based on which of the driver and the passenger provided the touch input, including:

in accordance with a determination that the driver provided the touch input:

in accordance with a determination that the driver that provided the touch input is a first user that has an identity registered with the system, enabling access to at least one function of the system based on the identity of the first user that is registered with the system; and in accordance with a determination that the driver that provided the touch input is a second user that has an identity registered with the system, different from the first user, limiting access to the at least one function of the system based on the identity of the second user that is registered with the system.

18. The non-transitory computer readable storage medium of claim 17, wherein the touch input is multi-touch input and the touch-sensitive display is a multi-touch-sensitive display.

19. The non-transitory computer readable storage medium of claim 17, wherein automatically determining is further based on input provided by one or more sensors from a group of sensors consisting of: a seat sensor, a seatbelt sensor, an infrared sensor, a proximity sensor, an optical sensor, a biometric sensor and a digital camera.

20. The non-transitory computer readable storage medium of claim 17, wherein automatically determining is further based on information previously stored in the system.

21. The non-transitory computer readable storage medium of claim 17, wherein automatically determining is further based on information received from a remote device over a communication channel.

22. The method of claim 1, wherein the determining whether the driver that provided the touch input is the first user or the second user includes identifying a respective user using a biometric sensor.

23. The method of claim 22, wherein the biometric sensor includes a fingerprint sensor.

24. The method of claim 1, wherein the determining whether the driver that provided the touch input is the first user or the second user includes identifying a respective user via an electronic device, other than the system.

25. The method of claim 1, wherein:

determining that the driver that provided the touch input is the first user includes determining that the first user has a first characteristic; and determining that the driver that provided the touch input is the second user includes determining that the second user has a second characteristic, different from the first characteristic.

* * * * *

UNITED STATES PATENT AND TRADEMARK OFFICE
CERTIFICATE OF CORRECTION

PATENT NO. : 11,441,919 B2
APPLICATION NO. : 11/862054
DATED : September 13, 2022
INVENTOR(S) : Joshua V. Graessley It is certified that error appears in the above-identified patent and that said Letters Patent is hereby corrected as shown below:

In the Claims

In Column 11, Line 42, in Claim 1, delete "touch- sensitive" and insert --touch-senstive--.

Signed and Sealed this
First Day of November, 2022

Katherine Kelly Vidal
*Director of the United States Patent and Trademark Office*